US010558921B2

(12) United States Patent
Jayaraman et al.

(10) Patent No.: US 10,558,921 B2
(45) Date of Patent: *Feb. 11, 2020

(54) MACHINE LEARNING CLASSIFICATION WITH CONFIDENCE THRESHOLDS

(71) Applicant: ServiceNow, Inc., Santa Clara, CA (US)

(72) Inventors: Baskar Jayaraman, Fremont, CA (US); Aniruddha Thakur, Saratoga, CA (US); Kannan Govindarajan, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,227

(22) Filed: Dec. 27, 2017

(65) Prior Publication Data
US 2019/0102683 A1    Apr. 4, 2019

Related U.S. Application Data

(63) Continuation of application No. 15/723,002, filed on Oct. 2, 2017.

(51) Int. Cl.
*G06N 5/02* (2006.01)
*G06F 16/28* (2019.01)
*G06N 7/00* (2006.01)

(52) U.S. Cl.
CPC ........... *G06N 5/022* (2013.01); *G06F 16/285* (2019.01); *G06N 7/005* (2013.01)

(58) Field of Classification Search
CPC ........ G06N 5/022; G06N 5/04; G06N 99/005; G06N 7/005; G06F 17/30598
See application file for complete search history.

(56) References Cited

U.S. PATENT DOCUMENTS 8,161,028 B2*  4/2012  Hu ................. G06F 17/3071
                                             707/706
8,315,453 B2* 11/2012  Shlain ............ G06K 9/6256
                                             382/149
(Continued)

FOREIGN PATENT DOCUMENTS

CA          2953969 A1    1/2016

OTHER PUBLICATIONS

Armando Suárez, Manuel Palomar, and German Rigau, "High Precision Word Sense Disambiguation Based on Maximum Entropy Probability Models", 2001, MEANING—Developing Multilingual Web-scale Language Technologies, pp. 1-24.*

(Continued)

*Primary Examiner* — Kamran Afshar
*Assistant Examiner* — Ying Yu Chen
(74) *Attorney, Agent, or Firm* — Fletcher Yoder PC

(57) ABSTRACT

A machine learning classifier may classify observations into one or more of i categories, and may be configured to: receive test data that includes j observations, each associated with a respective ground truth category, and produce output that provides, for each particular observation of the j observations, a set of i probabilities, one probability for each of the i categories. For each particular confidence threshold in k confidence thresholds, a computing device may: reclassify, into a null category, any of the j observations for which all of the set of i probabilities are less than the particular confidence threshold, and determine a respective precision value and a respective coverage value for a particular category of the i categories. A specific confidence threshold in the k confidence thresholds may be selected, and further observations may be reclassified into the null category in accordance with the specific confidence threshold.

14 Claims, 11 Drawing Sheets

| CATEGORY | ESTIMATED PRECISION | ESTIMATED COVERAGE | TOP KEYWORDS |
|---|---|---|---|
| EMAIL | 60% | 98% | EMAIL, OUTBOX, MESSAGES, MAILING |
| VPN | 47% | 76% | PASSWORD, AUTHENTICATION, VPN, NETWORK |
| CONTENT MANAGEMENT | 28% | 98% | CMS, IFRAME, PAGES |
| CORE PLATFORM | 9% | 69% | SCRIPT, PROXY, FILE |
| ADMINISTRATION | 24% | 91% | PATCH, UPGRADE, ACCESS |

(56) References Cited

U.S. PATENT DOCUMENTS

| | | | | |
|---|---|---|---|---|
| 8,364,467 | B1* | 1/2013 | Bowman | G06F 17/2765 |
| | | | | 704/1 |
| 8,793,146 | B2* | 7/2014 | Bonissone | G06Q 40/08 |
| | | | | 705/4 |
| 2008/0086433 | A1 | 4/2008 | Schmidtler et al. | |
| 2016/0189055 | A1 | 6/2016 | Zvitia | |
| 2017/0286869 | A1* | 10/2017 | Zarosim | G06N 99/005 |

OTHER PUBLICATIONS

Iyad Batal, Gregory Cooper, and Milos Hauskrecht, "A Bayesian Scoring Technique for Mining Predictive and Non-Spurious Rules", 2012, Mach Learn Knowl Discov Databases, pp. 1-20.*
Kalyanaraman Kaesava Kshetrapalapuram and Michael Kirley, "Mining Classification Rules Using Evolutionary Multi-objective Algorithms", 2005, Knowledge-Based Intelligent Information and Engineering Systems. KES 2005. Lecture Notes in Computer Science, vol. 3683. Springer, Berlin, Heidelberg, pp. 959-965.*
Armando Suárez, Manuel Palomar, and German Rigau, "High Precision Word Sense Disambiguation Based on Maximum Entropy Probability Models", 2001, MEANING—Developing Multilingual Web-scale Language Technologies, pp. 1-24. (Year: 2001).*
Iyad Batal, Gregory Cooper, and Milos Hauskrecht, "A Bayesian Scoring Technique for Mining Predictive and Non-Spurious Rules", 2012, Mach Learn Knowl Discov Databases, pp. 1-20. (Year: 2012).*
Kalyanaraman Kaesava Kshetrapalapuram and Michael Kirley, "Mining Classification Rules Using Evolutionary Multi-objective Algorithms", 2005, Knowledge-Based Intelligent Information and Engineering Systems. KES 2005. Lecture Notes in Computer Science, vol. 3683. Springer, Berlin, Heidelberg, pp. 959-965 (Year: 2005).*
Saeed Hashemi, "Coverage-Performance Curves for Classification in Datasets with Atypical Data", Nov. 4-5, 2002, Proceedings of the First International Conference on Machine Learning and Cybernetics, Beijing, p. 1946-1950. (Year: 2002).*
Simple guide to confusion matrix terminology, Mar. 25, 2014, downloaded from http://www.dataschool.io/simple-guide-to-confusion-matrix-terminology/ on Sep. 18, 2017.
Statistical Classification, downloaded from https://en.wikipedia.org/wiki/Statistical_classification on Sep. 18, 2017.
Extended European Search Report for European Application No. 17210970 dated Jul. 5, 2018; 8 pgs.
Office Action for Australian Patent Application No. 2018200014 dated Jan. 2, 2019; 4 pgs.
Canadian Official Action for Canadian Patent Application No. 2990452 dated Nov. 1, 2018; 6 pgs.

* cited by examiner

| CATEGORY | ESTIMATED PRECISION | ESTIMATED COVERAGE | TOP KEYWORDS |
|---|---|---|---|
| EMAIL | 60% | 98% | EMAIL, OUTBOX, MESSAGES, MAILING |
| VPN | 47% | 76% | PASSWORD, AUTHENTICATION, VPN, NETWORK |
| CONTENT MANAGEMENT | 28% | 98% | CMS, IFRAME, PAGES |
| CORE PLATFORM | 9% | 69% | SCRIPT, PROXY, FILE |
| ADMINISTRATION | 24% | 91% | PATCH, UPGRADE, ACCESS |

FIG. 8A

VPN

| ESTIMATED PRECISION | ESTIMATED COVERAGE | CONFIDENCE THRESHOLD |
| --- | --- | --- |
| 100% | 0% | 1.0 |
| 63% | 8% | 0.9 |
| 62% | 22% | 0.7 |
| 58% | 33% | 0.55 |
| 56% | 43% | 0.45 |
| 53% | 61% | 0.30 |
| 50% | 66% | 0.25 |
| 47% | 76% | 0.2 |
| 40% | 82% | 0.15 |

FIG. 8B

MACHINE LEARNING CLASSIFICATION WITH CONFIDENCE THRESHOLDS

CROSS-REFERENCE TO RELATED APPLICATION

This application is a continuation of and claims priority to U.S. patent application Ser. No. 15/723,002, filed Oct. 2, 2017, which is hereby incorporated by reference in its entirety.

BACKGROUND

A machine learning classifier predicts a category, from a discrete set of i categories, to which an observation belongs. This classification is based on a training set of j observations for which the ground truth category memberships are known. A popular example of a classifier is an email spam filter that classifies incoming email messages as either spam or not spam. Given a large and diverse enough training set, such a classifier can operate with high accuracy on new email messages.

SUMMARY

One of the drawbacks to machine learning classifiers is that an end user is not given enough control over the degree of confidence that the classifier uses when making classifications. For instance, if an email spam filter classifies a particular incoming email message as having a 98% probability of being spam and a 2% probability of not being spam, the classifier is exhibiting a high degree of confidence in its prediction. On the other hand, if the email spam filter classifies the message as having a 51% probability of being spam and a 49% probability of not being spam, the classifier is exhibiting a low degree of confidence in its prediction.

In some situations, the end user may wish to reclassify observations with predictions that are below a confidence threshold to a "don't know" or "null" category. Observations classified as such can be manually reviewed to determine their proper classifications, and the classifier can be retrained with this new understanding. Further, the efficacy of the classifier may be measured in terms of both its accuracy for the observations it does classify—i.e., those with a confidence of at least the confidence threshold, and how many observations are reclassified because their confidence is below the confidence threshold. After the efficacy of k confidence thresholds is considered in this manner, one or more of these confidence thresholds may be selected for use with further observations.

Accordingly, a first example embodiment may involve a machine learning classifier that classifies observations into one or more of i categories, where the machine learning classifier is configured to: receive test data, wherein the test data includes j observations, each associated with a respective ground truth category, where the ground truth categories are from the i categories, and produce output that provides, for each particular observation of the j observations, a set of i probabilities, one probability for each of the i categories. The first example embodiment may also involve a computing device containing a processor and memory, where the memory stores k confidence thresholds, and where the processor is configured to execute instructions stored in the memory to: for each particular confidence threshold in the k confidence thresholds: reclassify, into a null category that is not one of the i categories, any of the j observations for which all of the set of i probabilities are less than the particular confidence threshold, and determine, based on the j observations after reclassification and their associated sets of i probabilities, a respective precision value for a particular category of the i categories and a respective coverage value for the particular category. The processor may also be configured to: based on the k respective precision values and the k respective coverage values, select a specific confidence threshold in the k confidence thresholds; reclassify, into the null category in accordance with the specific confidence threshold, at least some further observations in further output from the machine learning classifier; and provide the reclassified further observations with the further output.

A second example embodiment may involve receiving, by a machine learning classifier that classifies observations into one or more of i categories, test data, where the test data includes j observations, each associated with a respective ground truth category, where the ground truth categories are from the i categories. The second example embodiment may also involve producing, by the machine learning classifier, output that provides, for each particular observation of the j observations, a set of i probabilities, one probability for each of the i categories. The second example embodiment may also involve obtaining, by a computing device, k confidence thresholds. The second example embodiment may also involve, for each particular confidence threshold in the k confidence thresholds, the computing device: reclassifying, into a null category that is not one of the i categories, any of the j observations for which all of the set of i probabilities are less than the particular confidence threshold, and determining, based on the j observations after reclassification and their associated sets of i probabilities, a respective precision value for a particular category of the i categories and a respective coverage value for the particular category. The second example embodiment may also involve, possibly based on the k respective precision values and the k respective coverage values, selecting a specific confidence threshold in the k confidence thresholds. The second example embodiment may also involve reclassifying, into the null category in accordance with the specific confidence threshold, at least some further observations in further output from the machine learning classifier. The second example embodiment may also involve providing the reclassified further observations with the further output.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts a graphical user interface, in accordance with example embodiments.

FIG. 8B depicts another graphical user interface, in accordance with example embodiments.

DETAILED DESCRIPTION

Figure 1:
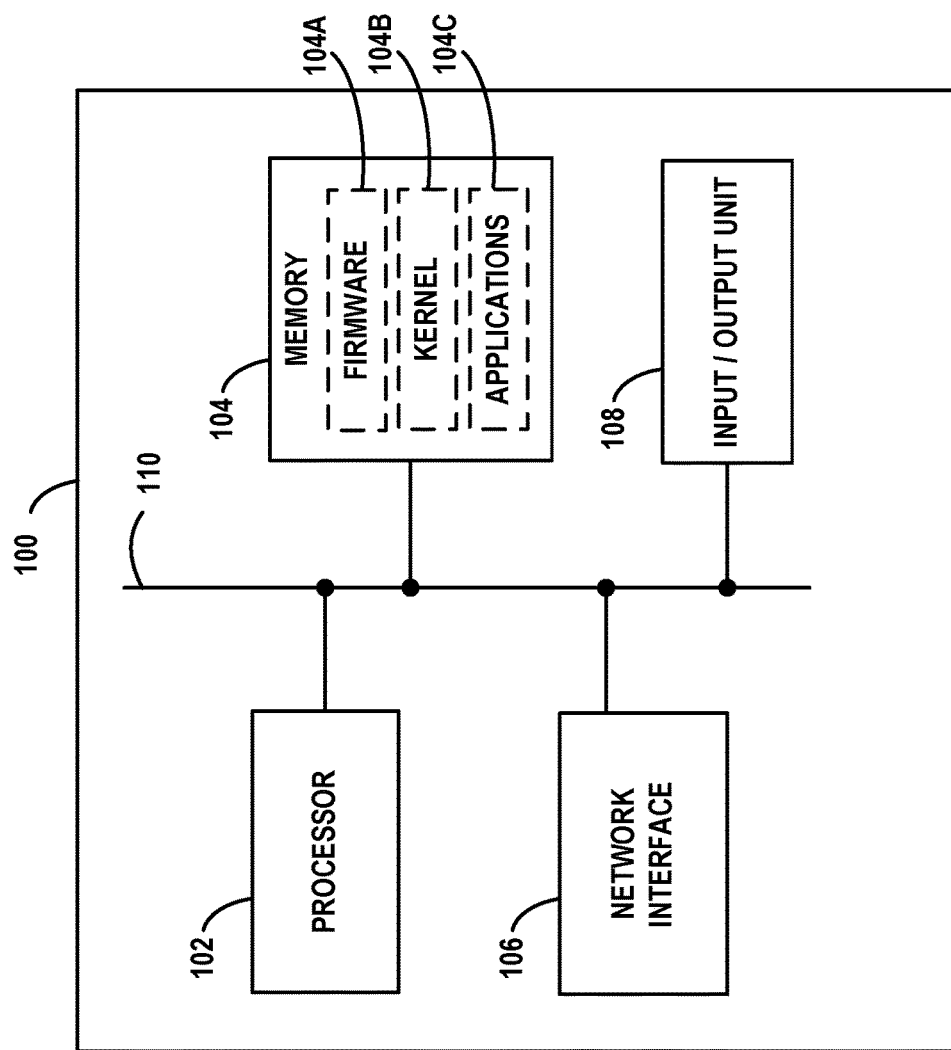
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
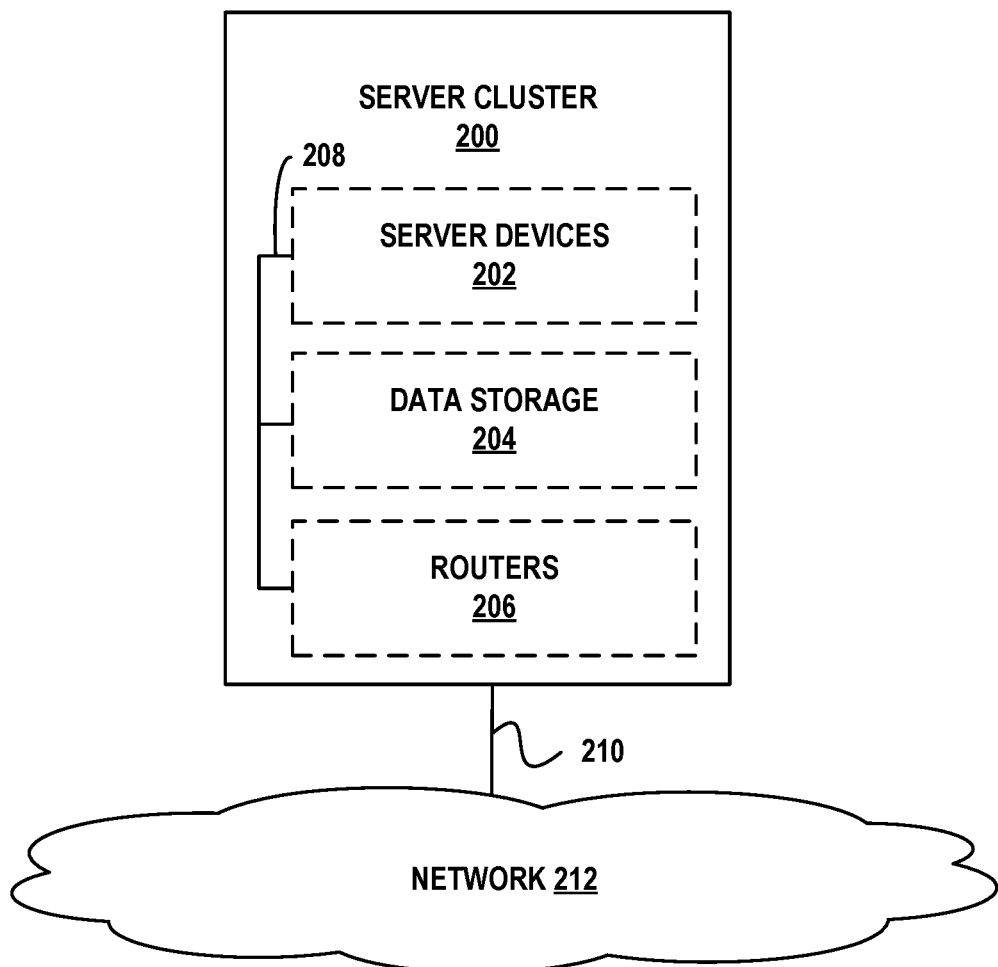
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
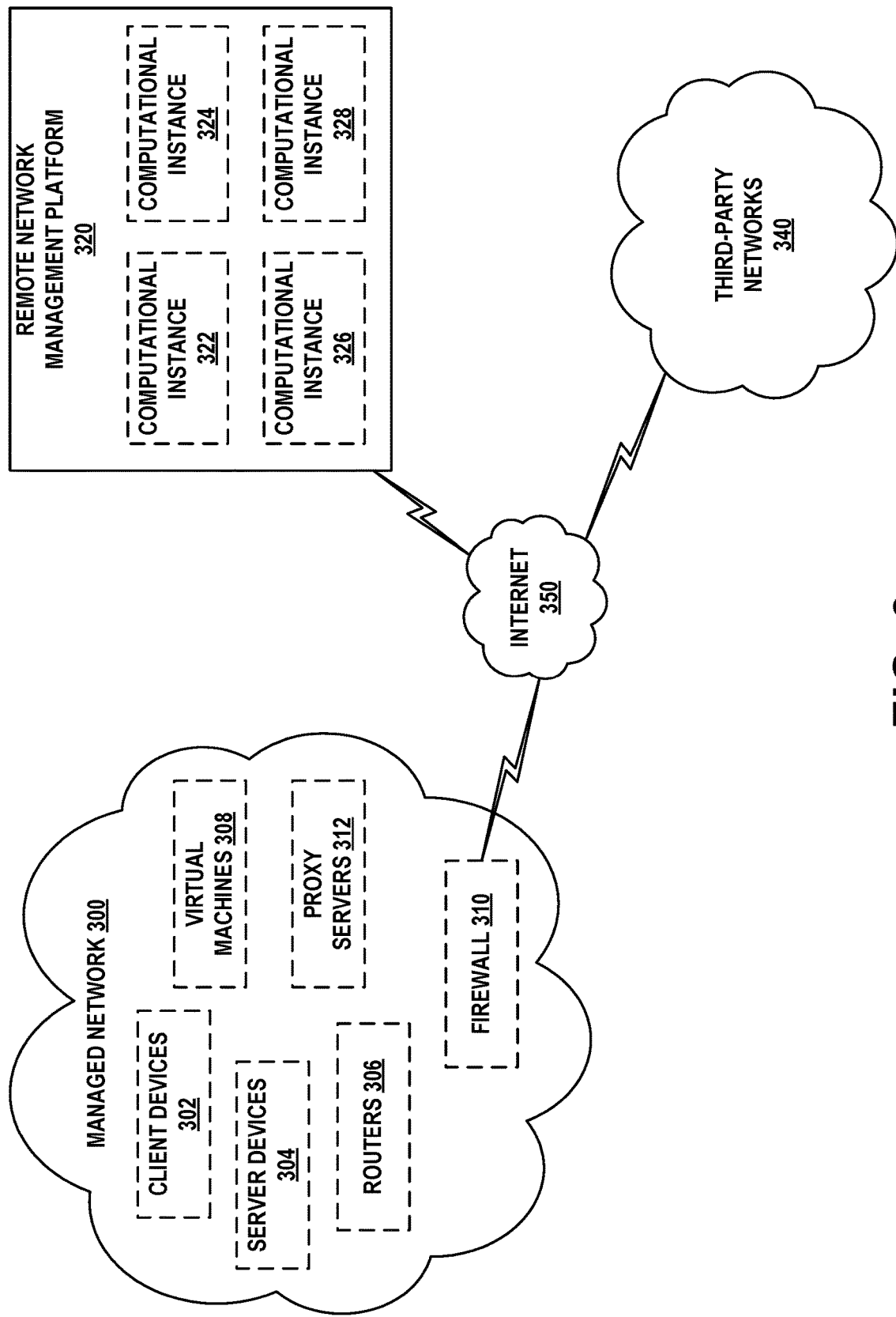
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
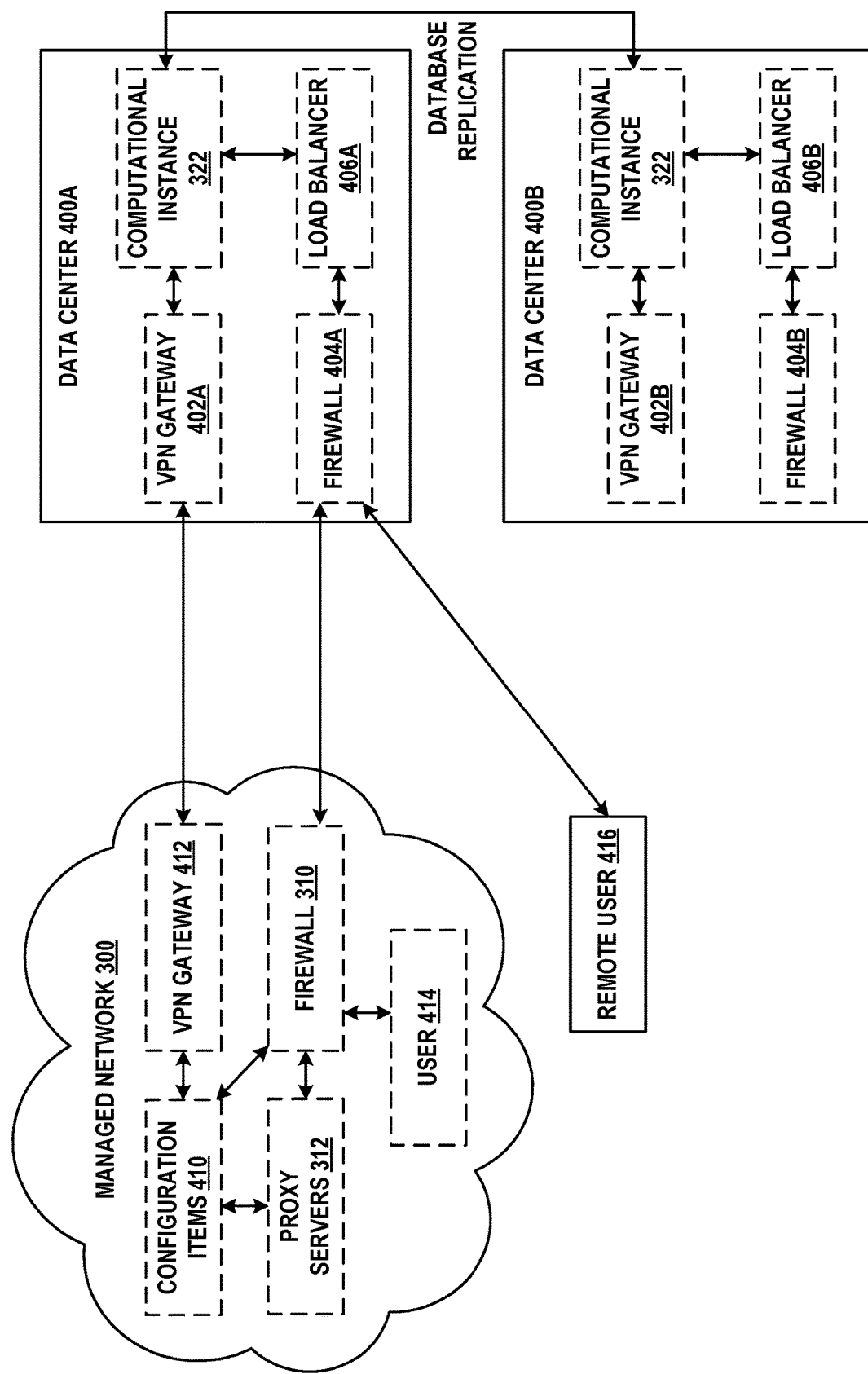
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
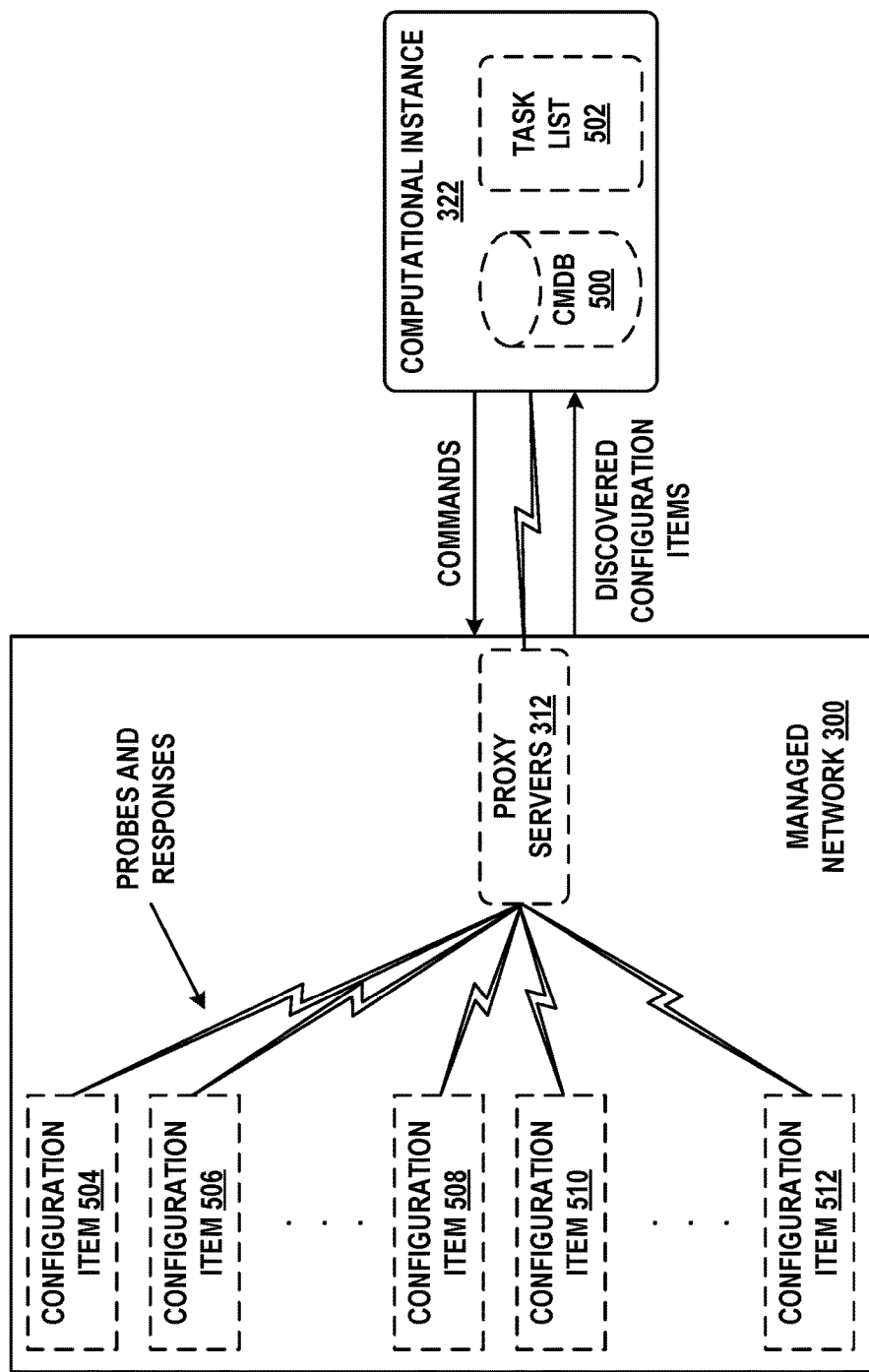
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
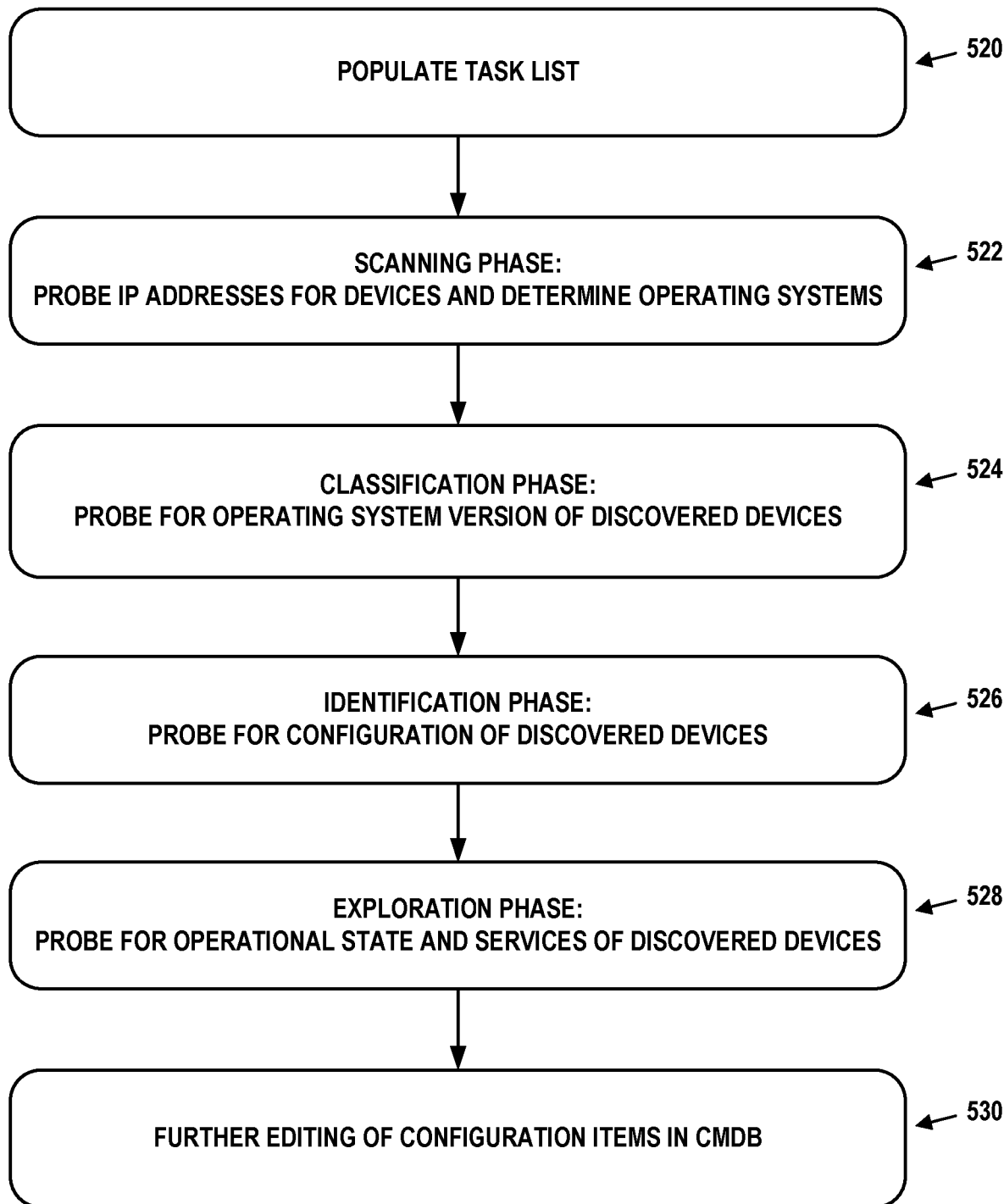
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Improved Machine Learning Classification

Generally, machine learning relates to the ability of computers to learn from and make predictions based on data. In practice, machine learning may include a process of providing a machine learning algorithm with training data to learn from, so as to create a machine learning model from this training data. The training data may include input values mapped to ground truth output values. Once the model is trained, it can predict the output values for new input values.

As described above, a classifier is a particular type of machine learning model that classifies observations (input values) into one or more of a number of categories (output values). A classifier can be trained by providing a training data set including observations mapped to ground truth categories thereof. With enough training data, the classifier can be expected to make reasonably accurate predictions of the categories of new observations.

Examples of machine learning classifiers include Bayesian classifiers, support vector machines, linear classifiers, k-nearest-neighbor classifiers, decision trees, random forests, and neural networks. Other types of classifiers may be possible.

A. Example Use of a Machine Learning Classifier

For purpose of example, suppose that an enterprise's IT department employs a classifier to help it determine the categories of IT help desk trouble tickets. These tickets may be opened by technology users who are having difficulties with hardware, software, or networking services. Each ticket may include a short text field (e.g., 1000 characters or less) containing a description of the problem in the words of the user who opened the ticket.

A challenge for a large enterprise is to properly prioritize open tickets into categories. Certain types of categories, such as security-related problems or wide-spread service outages are likely to be more important for the enterprise to address quickly than problems related to setting up an email account or deciding which web browser to use. Furthermore, users cannot be relied upon to self-categorize their problems reliably. What looks like a certain category of problem to a user might actually be of a different category. Or, a user may have no idea to which category his or her problem belongs, and therefore may decline to specify any category.

An IT department may receive hundreds or thousands of tickets per day. Thus, it is desirable for these tickets to be categorized rapidly and accurately. One way of addressing this problem to is employ a machine learning classifier.

In order to make the examples herein tractable and illustrative, the following assumes that there are only two categories in which the text fields of trouble tickets can be classified: email and VPN. In reality, there may be a number of additional categories for trouble tickets, such as booting, web browsing, group chat, Internet access, mobile access, and so on. The concepts behind the simple binary classifier used herein can easily be extended to any number of categories.

TABLE 1

| Text Field | Ground Truth Category |
| --- | --- |
| "My email signature does not have the company logo." | Email |
| "Outgoing messages not working." | Email |
| "Forgot my secure access password." | VPN |
| "Can't add members to department's mailing list." | Email |
| "VPN dropping every few minutes." | VPN |
| "Getting authentication failure when trying to access work from home." | VPN |
| "Two factor authentication not working." | VPN |
| "Messages stuck in outbox." | Email |
| "Slow data rates when logged into corporate network." | VPN |
| "VPN client crashing." | VPN |

Table 1 provides examples of text fields from trouble tickets categorized as either email issues or VPN issues. Here, it is assumed that the ground truth categories are known. These ground truth categories can be manually entered by IT professionals either from a reading of the text fields, after each trouble ticket has been resolved and its root cause has been identified, or in some other fashion.

In any event, a large data set similar to that of Table 1 (e.g., with hundreds or thousands of observations) may be gathered. Since the data set maps input values to ground truth output values, it can be used to train a classifier. This training may take place in a number of ways and in accordance with a number of algorithms. For instance, and without getting into the finer details of training, a classifier may be trained to look for certain keywords or keyphrases that are indicative of either email or VPN issues. For example, the keywords "email", "outbox", "messages", and "mailing" may be indicative of email issues, while the keywords "password", "authentication", "VPN", and "network" may be indicative of VPN issues. Nonetheless, more sophisticated categorization techniques may be learned by a classifier.

Regardless of how it is trained, it can be assumed that such a classifier exists. One way of gaining insight into the performance of a classifier is to examine its performance on new observations for which the ground truth classification is known. This can be accomplished by splitting a training data set into two parts. One part (e.g., 80%) can be used for the actual training, while the other part (e.g., the remaining 20%) can be used for evaluation. Since the part used for evaluation includes ground truth output values, the expected future performance of the classifier can be determined.

It may be implied that classifiers output just one predicted category for each new observation. However, this need not be the case. Some classifiers may instead output a probability that the new observation falls into each of the possible categories. As an example of the latter, the trouble ticket classifier may output respective predicted probabilities that each text field relates to email issues and VPN issues.

TABLE 2

| Text Fields | Email Probability | VPN Probability |
| --- | --- | --- |
| Text field 1 | 60% | 40% |
| Text field 2 | 10% | 90% |
| Text field 3 | 73% | 27% |

Table 2 illustrates a simple example of the output of such a classifier. For the observation "text field 1", the classifier predicts that the trouble ticket is related to email issues with 60% probability and to VPN issues with 40% probability. Similarly, for the observation "text field 2", the classifier predicts that the trouble ticket is related to email issues with 10% probability and to VPN issues with 90% probability. Likewise, for the observation "text field 3", the classifier predicts that the trouble ticket is related to email issues with 73% probability and to VPN issues with 27% probability.

From Table 2, it is clear that some predictions have a higher confidence than others. For instance, the prediction associated with "text field 2" gives a 90% probability of being related to VPN issues, whereas the prediction associated with "text field 1" gives email issues and VPN issues rather similar probabilities—60% and 40%, respectively.

B. Improved Machine Learning Classifiers with Confidence Thresholds

It may be beneficial to be able to state whether a particular prediction (with associated probabilities for each category) meets a given confidence threshold. The confidence threshold can be between 0 and 1, inclusive. A prediction meets a particular confidence threshold if the highest probability for any category is at least the confidence threshold. As an example, suppose that the confidence threshold for each category is 65% (0.65). Of the text fields in Table 2, the predictions for "text field 2" and "text field 3" meet the confidence threshold, because their highest probabilities are 90% (0.90) and 73% (0.73), respectively. On the other hand, the prediction for "text field 1" does not meet the confidence threshold because its highest probability is only 60% (0.60).

A confidence threshold of 0% (0.00) is met by any prediction. Therefore, this confidence threshold essentially indicates that the confidence associated with predictions is irrelevant. A confidence threshold of 100% (1.00) is only met by predictions that are absolutely certain to which category an observation belongs. In practice, very few predictions will meet such a high confidence threshold.

Note that the "confidence threshold" discussed herein is not necessarily related to a confidence interval or any other statistical measure. Instead, it is a threshold degree of certainty to which predictions can be compared. For any given confidence threshold, a particular prediction will either have a probability with at least the confidence threshold, or this probability will be less than the confidence threshold.

When a prediction does not meet a confidence threshold, that prediction may be ignored. In some cases, this is appropriate because the prediction has little value to the end user. For instance, if the trouble ticket classifier predicts that a certain text field value is related to email issues with 50% probability and related to VPN issues with 50% probability, this outcome is virtually useless to an IT professional. As such, predictions that do not meet the selected confidence threshold can be considered "don't know" predictions. The presence of such "don't know" predictions can be used, along with the predictions that meet the selected confidence threshold, to determine the effectiveness of the classifier. These "don't know" predictions may be referred to as being of a null category (i.e., a category other than one of the categories in which the observations are initially classified).

TABLE 3

|  | Predicted Email | Predicted VPN | Don't Know | Total |
|---|---|---|---|---|
| Actual Email | 150 | 23 | 7 | 180 |
| Actual VPN | 20 | 292 | 125 | 437 |
| Total | 170 | 315 | 132 |  |

Table 3 is a matrix providing hypothetical output of the trouble ticket classifier on 617 new observations, where a particular confidence threshold was used (for sake of this example, the actual value of this confidence threshold does not matter). Out of these, 180 were actually related to email issues, and 437 were actually related to VPN issues. The classifier predicted that 170 were related to email issues and that 315 were related to VPN issues. The classifier considered 132 observations as "don't know" because those observations did not meet the confidence threshold.

From this matrix, a few metrics can be derived. Each category has a precision value and a coverage value. The precision value is the percentage of observations, out of all observations predicted to be in a particular category, that are actually in the particular category. The coverage value is the percentage of non-null-category predictions made for observations in a particular category out of the total number of observations that are actually in the particular category.

Applying these metrics to the data in Table 3, email precision is 150/170=88.2%, email coverage is (150+23)/180=96.1%, VPN precision is 292/315=92.7%, and VPN coverage is (20+292)/437=71.4%. Interpreting these metrics, one can conclude that trouble tickets predicted to be related to email issues are correct 88.2% of the time, and 96.1% of these trouble tickets will result in usable prediction. One can also conclude that trouble tickets predicted to be related to VPN issues are correct 92.7% of the time, and 71.4% of these trouble tickets will result in usable prediction.

In an ideal situation, both precision and coverage will be close to 100% for all categories of a classifier. In practice, however, this is rarely the case. The inherent noise in real-world data sets often prevents either precision, coverage, or both from being that high.

Nonetheless, for some applications, the end user may find it desirable to have a very high precision for one or more categories at the expense of coverage, or vice versa. As an example, for the trouble ticket classifier, IT professionals may wish to have a very high precision for VPN related trouble tickets. This may be the situation because VPN issues are fundamentally related to enterprise security, and should be addressed expeditiously. Therefore, the IT professionals might not want VPN issues to be miscategorized as email issues, because email issues could be given a lower priority and critical VPN issues that are misclassified as email issues might be ignored for hours. Further, the IT professionals may be willing to manually examine a higher number of "don't know" trouble tickets (indicative of low coverage) in order to achieve this high precision. On the other hand, the same IT professionals may be willing to accept a lower precision for email issues as long as most trouble tickets relating to actual email issues are categorized as something other than "don't know."

These factors suggest that there may be a necessary tradeoff between precision and coverage for each of the classifier's categories, and that this tradeoff is controlled by the selected confidence threshold. Thus, it may be helpful for a machine learning classifier (or related software) to be able to (i) suggest a "good" confidence threshold that provides both a reasonably high precision and a reasonably high coverage, and (ii) provide a mechanism through which the end user can select a confidence threshold from a number of candidate confidence thresholds, where this selection provides the end user with an acceptable tradeoff between precision and coverage.

TABLE 4

| Confidence Threshold | VPN Precision | VPN Coverage | Objective Function |
|---|---|---|---|
| 0.5 | 52.4% | 100% | 0.524 |
| 0.6 | 81.3% | 74.9% | 0.609 |
| 0.7 | 92.7% | 71.4% | 0.662 |
| 0.8 | 95.4% | 66.1% | 0.630 |
| 0.9 | 98.6% | 64.5% | 0.636 |

Table 4 provides examples of VPN precision and VPN coverage for various confidence thresholds. For instance, a confidence threshold of 0.6 results in a VPN precision of 81.3% and a VPN coverage of 74.9%.

Table 4 also provides an "Objective Function" column that contains the mathematical product of the precision and the coverage for each confidence threshold. As an example, the confidence threshold of 0.6 has an objective function value of (0.813)(0.749)=0.609. Since the value of the objective function value scales with both precision and coverage, it can be used to evaluate which confidence threshold provides a good tradeoff between precision and coverage. Particularly, the higher the product, the better the confidence threshold. In Table 4, the confidence threshold of 0.7 has the highest objective function value of 0.662. In some embodiments an objective function other than a product can be used, such as a sum of the precision and coverage or a linear combination of these values.

Also, in this example, the confidence threshold of 0.5 provides a coverage of 100%. This is due to the example being a binary classifier—thus, at least one of the two possible categories will have a probability of at least 50%. This implies that there is no need to consider confidence thresholds of less than 0.5, as the precision can only decrease while the coverage cannot increase. When classifiers with more than two categories are used, confidence thresholds lower than 0.5 can be used without experiencing this limitation.

Figure 6A:
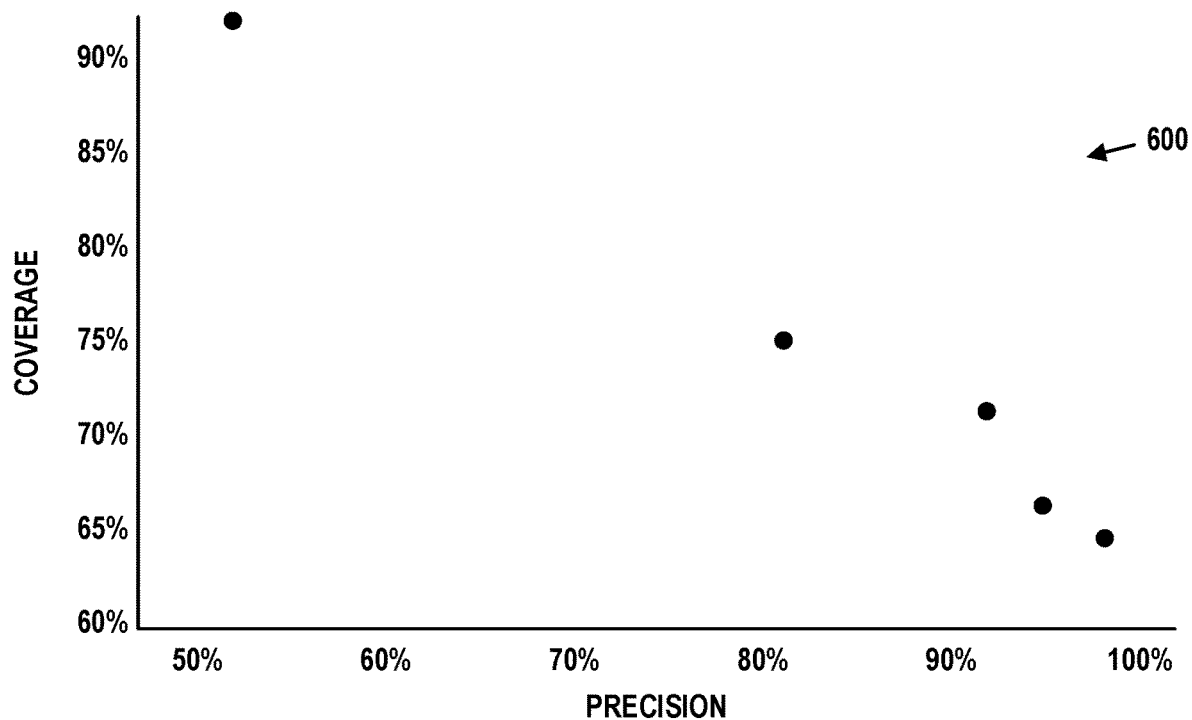
FIG. 6A is a graph that plots classification precision versus classification coverage, in accordance with example embodiments.

As an illustration of the tradeoff between precision and coverage, FIG. 6A plots the precision and coverage values from Table 4 against each other on graph 600. Notably, there is a roughly inverse linear relationship between precision and coverage for the example data. Also, the point for a precision of 52.4% is placed lower than 100% on the coverage axis due to space limitations, but its position as shown still serves to represent this relationship.

Figure 6B:
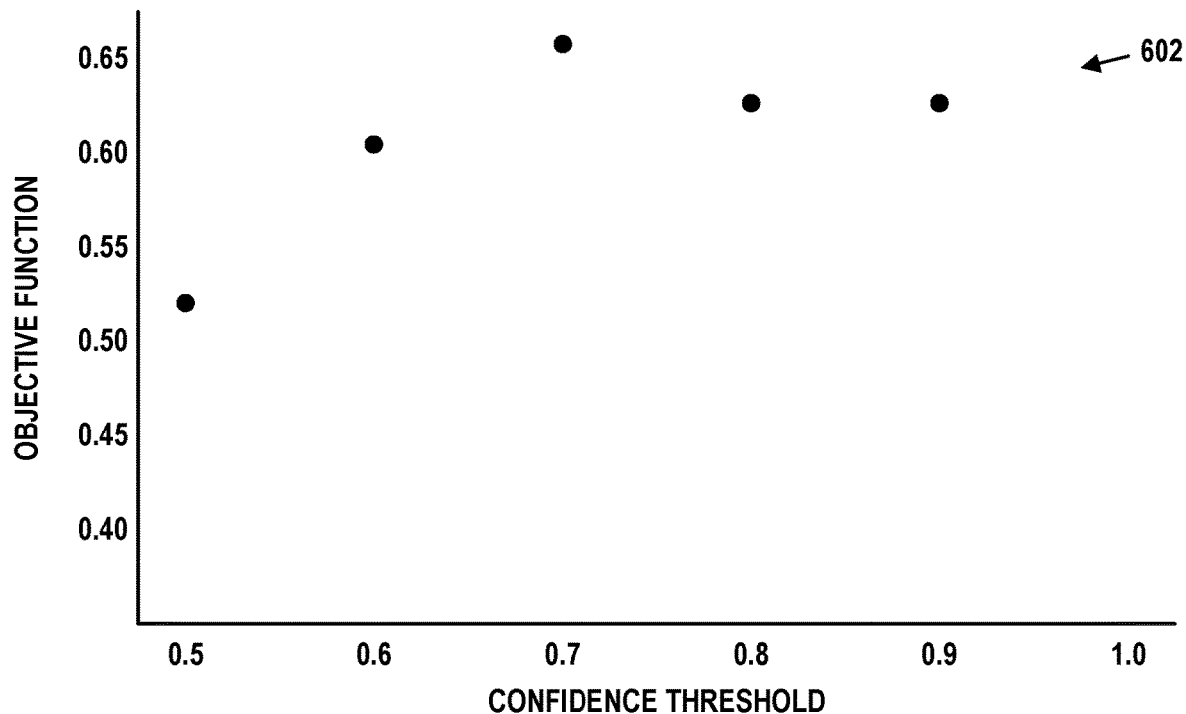
FIG. 6B is a graph that plots confidence threshold values versus objective function values, in accordance with example embodiments.

As an illustration of the relationship between confidence threshold and the objective function, FIG. 6B plots these values from Table 4 against each other on graph 602. As noted previously, the maximum objective function is associated with a confidence threshold of 0.7.

Figure 7:
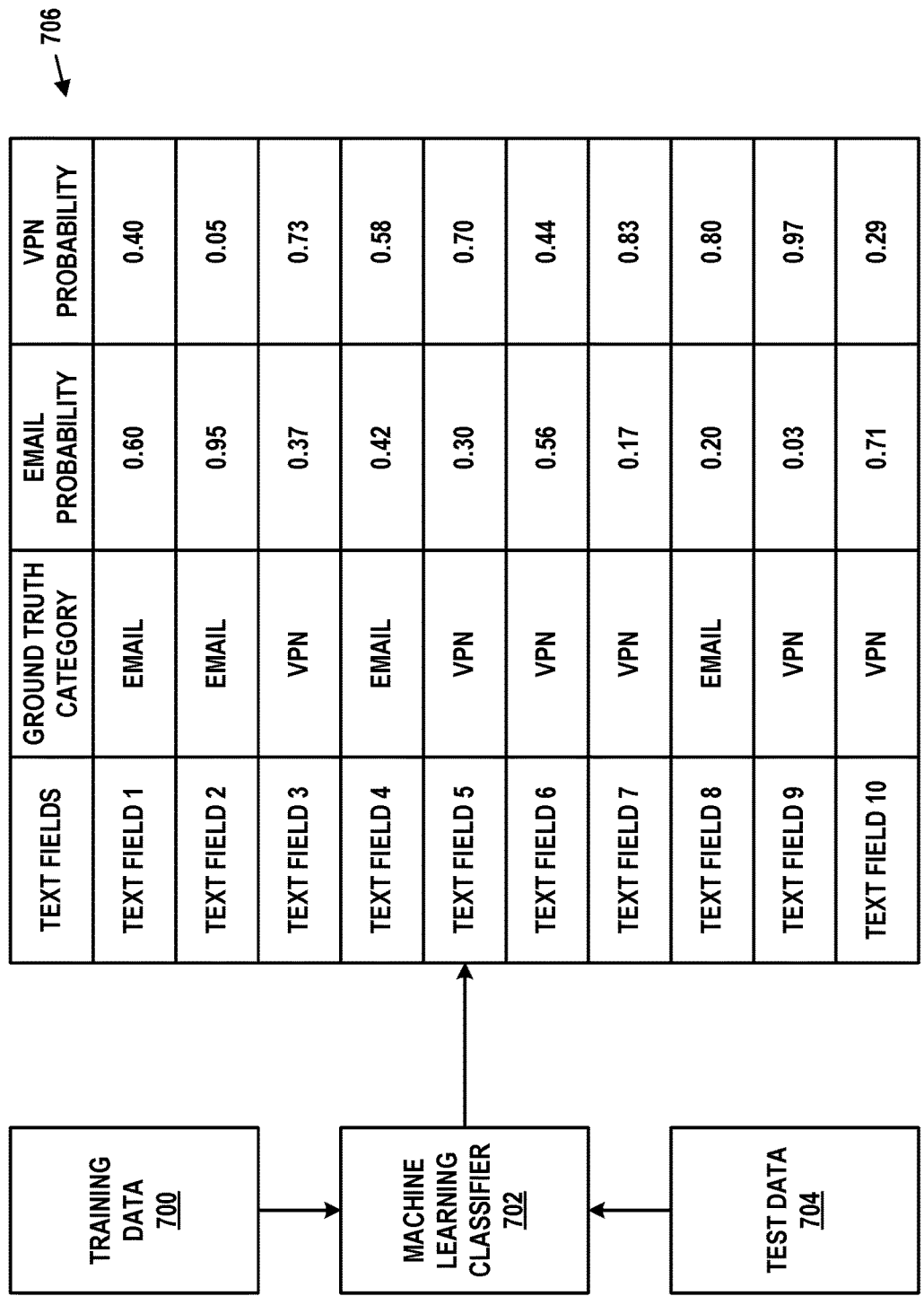
FIG. 7 depicts classifications of observations, in accordance with example embodiments.

FIG. 7 provides an example of how a machine learning classifier can be trained, and example output that it could produce. Particularly, training data 700 is a data set that maps observations to their ground truth categories. In this case, the trouble ticket example discussed herein is used, so training data 700 would map text fields to the categories of email and/or VPN.

From training data 700, machine learning classifier 702 is built. This classifier attempts to predict, for new observations, the probabilities with which these observations will be of each category.

Once machine learning classifier 702 is built, it can be tested with test data 704. Test data 704 may also map observations to their ground truth categories, e.g., text fields to the categories of email or VPN. In fact, training data 700 and test data 704 may both be derived from the same master data set. For instance, the master data set may have been split into two parts, one containing 80% of the master data set and the other containing 20% of the master data set. The part with 80% of the master data set may be training data 700, and the part with 20% of the master data set may be test data 704.

Applying machine learning classifier 702 to test data 704 may result in output 706. This output provides, for each observation, the predicted probabilities that the observation belongs to each of the categories. While output 706 shows the ground truth category for each observation, these ground truth values may be obtained directly from test data 704 rather than through machine learning classifier 702.

In this example, each observation is a text field, and the two categories are email and VPN. In each entry of output 706, machine learning classifier 702 provides probabilities for each category. But the category with the highest probability for each entry may be considered to be the predicted category. Thus, text field 1 is classified as email, text field 2 is classified as email, text field 3 is classified as VPN, and so on.

In output 706 there are four entries that belong to the email category, two of which were predicted correctly. Thus, the email category has a precision of 50%. There are also six entries that belong to the VPN category, four of which were predicted correctly. Thus, the VPN category has a precision of 66.6%. Since there are no "don't know" predictions, both categories have a coverage of 100%.

In order to determine the impact of confidence thresholds on precision and coverage, each confidence threshold may be applied, one by one, to output 706. For instance, applying a confidence threshold of 0.6 to output 706 results in text fields 4 and 6 becoming "don't know" predictions, because their highest respective probabilities are less than 0.6. A matrix similar to that of Table 3 can be formed for this confidence threshold, and is shown as Table 5.

TABLE 5

|  | Predicted Email | Predicted VPN | Don't Know | Total |
|---|---|---|---|---|
| Actual Email | 2 | 1 | 1 | 4 |
| Actual VPN | 1 | 4 | 1 | 6 |
| Total | 3 | 5 | 2 | |

From Table 5, email precision is 66.7%, email coverage is 75.0%, VPN precision is 80.0%, and VPN coverage is 83.3%. The value of the objective function for email is 0.5 and for VPN is 0.67.

Likewise, applying a confidence threshold of 0.8 to output 706 results in text fields 1, 3, 4, 5, 6, and 10 becoming "don't know" predictions, because their highest respective probabilities are less than 0.8. A matrix similar to that of Table 3 can be formed for this confidence threshold, and is shown as Table 6.

TABLE 6

|  | Predicted Email | Predicted VPN | Don't Know | Total |
|---|---|---|---|---|
| Actual Email | 1 | 1 | 2 | 4 |
| Actual VPN | 0 | 2 | 4 | 6 |
| Total | 1 | 3 | 6 | |

From Table 6, email precision is 100.0%, email coverage is 50.0%, VPN precision is 66.6%, and VPN coverage is 33.3%. The value of the objective function for email is 0.5 and for VPN is 0.22.

In this simple example, the impact of each applied confidence threshold can be determined. For email, using a confidence threshold of 0.8 instead of 0.6 results in no change to the objective function value. For VPN, using a confidence threshold of 0.8 instead of 0.6 results in a lower objective function value. This suggests that the end user use a confidence threshold of 0.6 for VPN, and that either confidence threshold may be used for email. Thus, this procedure can result in different confidence thresholds being recommended for different categories.

The examples provided herein are simple for purpose of illustration. Actual embodiments of training data 700 and test data 704 may include hundreds or thousands of observations mapped to respective categories. Additionally, machine learning classifier 702 may be a multi-category classifier supporting more than just two categories. As noted previously, while each new observation may be classified into a single one of these categories, machine learning classifier 702 may provide a probability that an observation belongs to each category, where the category with the highest probability is the category in which the observation is classified.

C. Example Graphical User Interfaces

Based on the discussion above, various techniques may be employed to improve machine learning classifier efficacy when confidence thresholds are used. The machine learning classifier may be applied to input data with ground truth categories for each observation therein, and produce output (such as output 706). This output is then filtered (i.e., reclassified) by each of some number of confidence thresholds. For each confidence threshold, a precision value, coverage value, and objective function value may be determined. For each category, the highest objective function value across all confidence thresholds may be selected as the recommend default for that category. But the end user may be able to select a confidence threshold with a lower objective function value through use of a graphical user interface.

FIG. 8A depicts a graphical user interface 800 containing a table. The table includes entries for each of at least five categories in which trouble tickets can be classified (for purpose of illustration, this example expands upon the binary classifier described above). Each entry is represented by a row of the table, and contains the category name, estimated precision, estimated coverage, and top keywords associated with observations that were classified into the category. The estimated precision and estimated coverage values shown may be associated with various default or user-selected confidence thresholds for each category. Thus, observations in these categories may be reclassified in accordance with the category's confidence threshold in order to separate out observations that the machine learning classifier cannot classify with a high enough confidence. The table may be able to be sorted by any of the columns if the end user clicks on or otherwise activates the name of the column.

Graphical user interface 800 represents a configuration associated with a machine learning classifier. For example, when applied to further observations, the machine learning classifier is expected to exhibit a 60% precision and a 98% coverage when classifying email.

If the end user selects or otherwise activates one of the information icons 804, the graphical user interface may display more information about the associated category. If the end user selects or otherwise activates one of the checkboxes 802, the end user may be taken to another graphical user interface that provides estimated precision and coverage values for the associated category over a number of confidence thresholds.

To that point, in FIG. 8B, graphical user interface 806 shows a table that contains estimated precision and coverage values for the VPN category across a number of confidence thresholds. The default confidence threshold, as determined by the objective function, is in the second to last row, and is italicized. This row contains the same precision and coverage values as the VPN entry in the table of FIG. 8A. But precision and coverage values for a range of other confidence thresholds are also displayed. The table may be able to be sorted by any of the columns if the end user clicks on or otherwise activates the name of the column.

If the end user selects or otherwise activates one of the information icons 810, the graphical user interface may display more information about the associated confidence threshold. If the end user selects or otherwise activates one of the checkboxes 808, the associated confidence threshold may be selected. Then the end user may be returned to graphical user interface 800, which displays precision and coverage values for the selected confidence threshold. In this way, the user can override the default precision and coverage values as he or she sees fit.

There are at least three ways in which this technique improves over traditional machine learning classifiers. First, confidence thresholds can be taken into account, which allows the end user to set aside (reclassify to a null category) observations that the machine learning classifier does not classify with a corresponding degree of certainty. Doing so gives the end user more control over the classification process. Second, the objective function provides a recommended confidence threshold to the end user by default, where this recommendation may be a reasonable tradeoff between precision and coverage. Third, the end user can view pairs of precision and coverage values associated with a number of confidence thresholds. Based on the end user's goals and judgment, he or she can override the default confidence threshold that was determined using the objective function, and select a different pair of precision and coverage values. Additional improvements are possible.

VI. Example Operations

Figure 9:
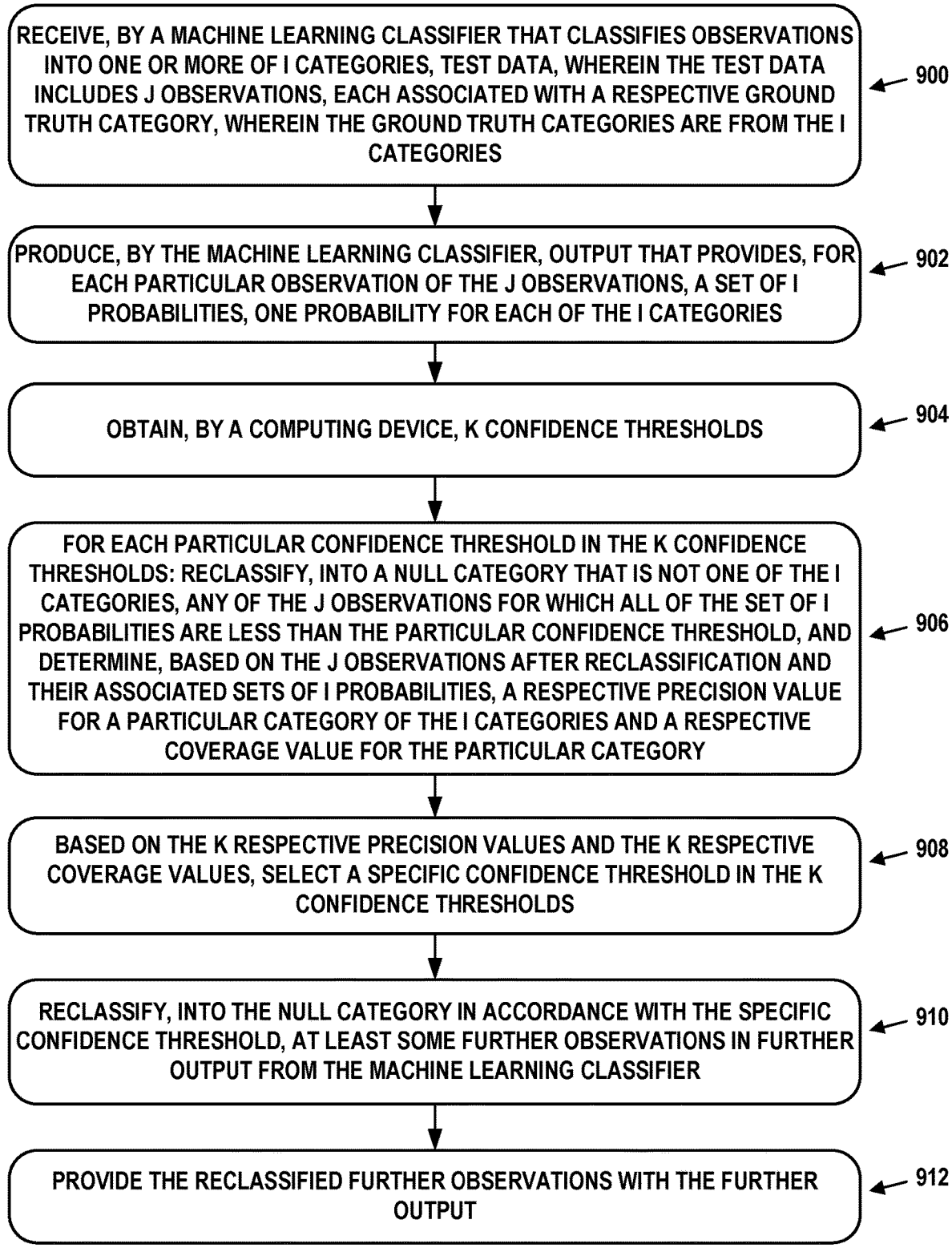
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve receiving, by a machine learning classifier that classifies observations into one or more of i categories, test data. The test data may include j observations, each associated with a respective ground truth category. The ground truth categories may be from the i categories. Both i and j may take on values of 1 or more.

Block 902 may involve producing, by the machine learning classifier, output that provides, for each particular observation of the j observations, a set of i probabilities, one probability for each of the i categories.

Block 904 may involve obtaining, by a computing device, k confidence thresholds. The value of k may also be 1 or more.

Block 906 may involve, for each particular confidence threshold in the k confidence thresholds, the computing device: reclassifying, into a null category that is not one of the i categories, any of the j observations for which all of the set of i probabilities are less than the particular confidence threshold, and determining, based on the j observations after reclassification and their associated sets of i probabilities, a respective precision value for a particular category of the i categories and a respective coverage value for the particular category.

Block 908 may involve, possibly based on the k respective precision values and the k respective coverage values, selecting a specific confidence threshold in the k confidence thresholds.

Block 910 may involve reclassifying, into the null category in accordance with the specific confidence threshold, at least some further observations in further output from the machine learning classifier.

Block 912 may involve providing the reclassified further observations with the further output.

In some embodiments, the machine learning classifier predicts that a specific observation of the j observations belongs to the particular category when the particular category is associated with a highest of the set of i probabilities for the specific observation.

In some embodiments, the respective precision value indicates an accuracy with which the machine learning classifier predicts that the j observations are in their associated ground truth categories.

In some embodiments, the respective coverage value indicates, for the particular category, the percentage of the j observations that were not reclassified into the null category.

In some embodiments, further operations may include: for each particular confidence threshold in the k confidence thresholds, calculate a respective objective function value based on the respective precision and the respective coverage. Selecting the specific confidence threshold may involve selecting an objective function value from the k respective objective function values. The selected objective function value may be associated with the specific confidence threshold.

In some embodiments, the respective objective function value is a multiplicative product of the respective precision value and the respective coverage value. Alternatively or additionally, selecting the objective function value from the k respective objective function values involves selecting a highest objective function value of the k respective objective function values.

In some embodiments, selecting the specific confidence threshold may involve: transmitting, to a client device, a table-based graphical representation of the k respective precision values and the k respective coverage values, where each row in the table depicts an associated pair of the k respective precision values and the k respective coverage values, and receiving, from the client device, a selection of one of the rows in the table, where the selected row contains a precision value and a coverage value associated with the specific confidence threshold.

In some embodiments, each of the further observations are associated with respective sets of i probabilities, one probability for each of the i categories. Reclassifying at least some further observations may involve reclassifying any of the further observations for which all of the associated set of i probabilities are less than the specific confidence threshold.

In some embodiments, the set of i probabilities for the particular observation are predicted likelihoods that the particular observation belongs to each of the i categories, respectively.

In some embodiments, the confidence threshold is between 0 and 1, inclusive.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a machine learning classifier that:
      receives input observations;
      predicts, for each respective input observation, a set of probabilities that indicate a likelihood of each respective input observation belonging to each respective output category of a plurality of output categories, wherein the set of probabilities are predicted based at least in part on a keyword analysis of the input observations identify one or more keywords within test data, wherein each of the one or more keywords are associated with information technology help desk trouble tickets; and
      classifies each respective input observation into the output category having a highest probability; and
   a memory comprising program instructions that, when executed by a processor, cause the computing system to:
      obtain a plurality of confidence thresholds for predictions made by the machine learning classifier;
      reclassify, for each confidence threshold of the plurality of confidence thresholds, any of the input observations for which all probabilities of the set of probabilities are less than the confidence threshold into a null category that is not one of the output categories;
      after the reclassifying, determine, for each confidence threshold of the plurality of confidence thresholds and for each output category, a precision value that indicates an accuracy with which the machine learning classifier predicts that the input observations are in a respective ground truth category;

after the reclassifying, determine, for each confidence threshold of the plurality of confidence thresholds and for each output category, a coverage value that indicates a percentage of the input observations that were not reclassified into the null category;

after the reclassifying, determine, for each confidence threshold of the plurality of confidence thresholds and for each output category, an objective function value, wherein the objective function value is a multiplicative product of the precision value and the coverage value;

generate, via the processor, a graphical user interface for display on a client device coupled to the processor, wherein the graphical user interface visually associates the plurality of confidence thresholds, precision values, coverage values, results of the keyword analysis, and objective function values for each of the output categories, wherein the confidence threshold is one of the plurality of confidence thresholds displayed on the graphical user interface, and wherein each of the plurality of confidence thresholds are selectably displayed with the precision values, the coverage values, and the objective function values;

receive a selection input via the graphical user interface of one of the precision values, the coverage values, or the objective function values, or any combination thereof for each of the previously presented output categories; and perform, in conjunction with the machine learning classifier, further classification of additional input observations into the output categories and the null category in accordance with a combination of the precision values, the coverage values, or the objective function values, or any combination thereof, via the graphical user interface.

2. The computing system of claim 1, wherein a respective objective function value is displayed on the graphical user interface for each of the plurality of confidence thresholds, and wherein a highest objective function value of the objective function values is emphasized on the graphical user interface.

3. The computing system of claim 1, wherein the graphical user interface represents a table, each row in which depicts an associated set of the plurality of confidence thresholds, the precision values, and the coverage values.

4. The computing system of claim 1, wherein each of the additional input observations are associated with an additional respective set of probabilities, and wherein classification of the additional input observations into the output categories and the null category comprises:

reclassifying any of the additional input observations for which all of the additional respective set of probabilities are less than the confidence threshold into the null category.

5. The computing system of claim 1, wherein the confidence threshold is between 0 and 1, inclusive.

6. A method comprising:

obtaining, by a computing system, a plurality of confidence thresholds for predictions made by a machine learning classifier, wherein the machine learning classifier:

receives input observations;

predicts, for each respective input observation, a set of probabilities that indicate a likelihood of each respective input observation belonging to each respective output category of a plurality of output categories, wherein the set of probabilities are predicted based at least in part on a keyword analysis of the input observations, and wherein each of one or more keywords are associated with information technology help desk trouble tickets; and classifies each respective input observation into the output category having a highest probability of the plurality of output categories;

reclassifying, for each confidence threshold of the plurality of confidence thresholds, by the computing system, any of the input observations for which all probabilities of the set of probabilities are less than a corresponding confidence threshold into a null category that is not one of the output categories;

after the reclassifying, determining, by the computing system, for each confidence threshold of the plurality of confidence thresholds and for each of the plurality of output categories, a precision value that indicates an accuracy with which the machine learning classifier predicts that the input observations are in a respective ground truth categories;

after the reclassifying, determining, by the computing system, for each confidence threshold of the plurality of confidence thresholds and for each of the plurality of output categories, a coverage value that indicates a percentage of the input observations that were not reclassified into the null category;

after the reclassifying, determining, by the computing system, for each confidence threshold of the plurality of confidence thresholds and for each of the plurality of output categories, an objective function value, wherein the objective function value is a multiplicative product of the precision value and the coverage value;

generating a graphical user interface for display, wherein the graphical user interface visually associates the plurality of confidence thresholds, precision values, coverage values, results of the keyword analysis, and objective function values for each of the plurality of output categories, wherein the confidence threshold is one of the plurality of confidence thresholds on the graphical user interface, and wherein each of the plurality of confidence thresholds are selectably displayed with the precision values, the coverage values, and the objective function values;

receiving a selection input via the graphical user interface of one of the precision values, the coverage values, or the objective function values, or any combination thereof for each of the plurality of output categories; and performing, by at least the machine learning classifier, further classification of additional input observations into the plurality of output categories and the null category in accordance with a combination of the precision values, the coverage values, or the objective function values, or any combination thereof, via the graphical user interface.

7. The method of claim 6, wherein a respective objective function value is displayed on the graphical user interface for each of the plurality of confidence thresholds, and wherein a highest objective function value of the objective function values is emphasized on the graphical user interface.

8. The method of claim 6, wherein the graphical user interface represents a table, each row in which depicts an associated set of the plurality of confidence thresholds, the precision values, and the coverage values.

9. The method of claim 6, wherein each of the additional input observations are associated with a respective set of probabilities that the respective input observation belongs to each of the set of respective output categories, and wherein classification of the additional input observations into the set of respective output categories and the null category comprises:

reclassifying, into the null category, any of the additional input observations for which all of the probabilities of the respective set of probabilities are less than the corresponding confidence threshold into the null category.

10. The method of claim 6, wherein the corresponding confidence threshold is between 0 and 1, inclusive.

11. The method of claim 6, comprising:

presenting on the graphical user interface a table that visually associates each confidence threshold to a precision value, a coverage value, a result of the keyword analysis, and an objective function value for the confidence threshold.

12. The method of claim 11, comprising:

generating data corresponding to the table, wherein the data is configured to cause the table to comprise a column of the results of the keyword analysis.

13. The method of claim 11, comprising:

generating data corresponding to the table, wherein the data is configured to cause the table to comprise a column of the precision values, a column of the coverage values, and the column of the results of the keyword analysis.

14. An article of manufacture including a non-transitory computer-readable medium, having stored thereon program instructions that, upon execution by a computing system, cause the computing system to perform operations, the operations comprising:

obtaining a plurality of confidence thresholds for predictions made by a machine learning classifier, wherein the machine learning classifier:

receives input observations;

predicts, for each respective input observation, a set of probabilities that indicate a likelihood of each respective input observation belonging to each respective output category of a plurality of output categories, wherein the set of probabilities are predicted based at least in part on a keyword analysis of the input observations, and wherein each of one or more keywords are associated with information technology help desk trouble tickets; and classifies each respective observation into the output category having a highest probability of the plurality of output categories;

reclassifying, for each confidence threshold of the plurality of confidence thresholds, any of the input observations for which all probabilities of the set of probabilities are less than the confidence threshold into a null category that is not one of the plurality of output categories;

after the reclassifying, determining, for each confidence threshold of the plurality of confidence thresholds and for each output category of the plurality of output categories, a precision value that indicates an accuracy with which the machine learning classifier predicts that the input observations are in a respective ground truth categories;

after the reclassifying, determining, for each confidence threshold of the plurality of confidence thresholds and for each output category of the plurality of output categories, a coverage value that indicates a percentage of the input observations that were not reclassified into the null category;

after the reclassifying, determining, for each confidence threshold of the plurality of confidence thresholds and for each output category of the plurality of output categories, an objective function value, wherein the objective function value is a multiplicative product of the precision value and the coverage value;

generating, a graphical user interface for display, wherein the graphical user interface visually associates the plurality of confidence thresholds, precision values, coverage values, results of the keyword analysis, and objective function values for each of the plurality of output categories, wherein each confidence threshold of the plurality of confidence thresholds is on the graphical user interface, and wherein each of the plurality of confidence thresholds are selectably displayed with the precision values, the coverage values, and the objective function values;

receiving a selection input via the graphical user interface of one of the precision values, the coverage values, or the objective function values, or any combination thereof for each of the plurality of output categories; and performing, by at least the machine learning classifier, further classification of additional input observations into the output categories and the null category in accordance with a combination of the precision values, the coverage values, or the objective function values, or any combination thereof via the graphical user interface.

* * * * *